US009115227B2

(12) United States Patent
Campus et al.

(10) Patent No.: US 9,115,227 B2
(45) Date of Patent: Aug. 25, 2015

(54) PROCESS FOR PRODUCING A POLYMER AND A POLYMER FOR WIRE AND CABLE APPLICATIONS

(75) Inventors: Alfred Campus, Eysins (SE); Markus Huber, Sommerein (AT); Ulf Nilsson, Stenungsund (SE); Hermann Schild, Vienna (AT); Annika Smedberg, Myggenas (SE); Bjorn Voigt, Hisings Backa (SE)

(73) Assignee: Borealis AG, Vienna (AT)

(*) Notice: Subject to any disclaimer, the term of this patent is extended or adjusted under 35 U.S.C. 154(b) by 419 days.

(21) Appl. No.: 13/002,857

(22) PCT Filed: Jul. 8, 2009

(86) PCT No.: PCT/EP2009/004930
§ 371 (c)(1),
(2), (4) Date: Mar. 24, 2011

(87) PCT Pub. No.: WO2010/003650
PCT Pub. Date: Jan. 14, 2010

(65) Prior Publication Data
US 2011/0168427 A1 Jul. 14, 2011

(30) Foreign Application Priority Data
Jul. 10, 2008 (EP) .................................. 08252360

(51) Int. Cl.
H01B 3/44 (2006.01)
C08F 10/02 (2006.01)
H01B 3/30 (2006.01)
C08F 110/02 (2006.01)
C08F 210/16 (2006.01)
C08F 210/02 (2006.01)

(52) U.S. Cl.
CPC .............. *C08F 10/02* (2013.01); *C08F 110/02* (2013.01); *C08F 210/02* (2013.01); *C08F 210/16* (2013.01); *C08F 2500/08* (2013.01); *H01B 3/308* (2013.01); *H01B 3/441* (2013.01)

(58) Field of Classification Search
CPC ...... C08F 10/02; C08F 110/02; C08F 210/02; C08F 210/16; C08F 2500/08; H01B 3/441; H01B 3/308
See application file for complete search history.

(56) References Cited

U.S. PATENT DOCUMENTS

| 4,085,266 A * | 4/1978 | Nakai et al. ..................... 526/65 |
| 4,234,624 A | 11/1980 | Linderoth et al. |
| 4,599,391 A | 7/1986 | Yamamoto et al. |
| 4,871,819 A | 10/1989 | Oonishi et al. |
| 4,994,539 A | 2/1991 | Orikasa et al. |
| 6,407,191 B1 * | 6/2002 | Mezquita et al. ............. 526/227 |
| 2006/0149103 A1* | 7/2006 | Shutt et al. .................... 585/327 |
| 2008/0125553 A1* | 5/2008 | Conrad et al. .................. 526/64 |
| 2011/0162869 A1 | 7/2011 | Smedberg et al. |
| 2011/0180304 A1 | 7/2011 | Smedberg et al. |

FOREIGN PATENT DOCUMENTS

| CN | 1300085 | 6/2001 |
| DE | 108546 | 9/1974 |
| EP | 0463402 | 1/1992 |
| EP | 0928797 | 7/1999 |
| WO | 9308222 | 4/1993 |
| WO | 9413707 | 6/1994 |
| WO | 9523829 | 9/1995 |
| WO | 96/35732 | 11/1996 |
| WO | 03000740 | 1/2003 |
| WO | 2006131266 | 12/2006 |
| WO | 2010003649 | 1/2010 |
| WO | 2010003651 | 1/2010 |

OTHER PUBLICATIONS

Mortimer, G. A., "Chain Transfer in Ethylene Polymerization", J. Polym. Sci.: Part A-1 1966, 4, 881-900.*
International Search Report dated Nov. 12, 2009 for international application No. PCT/EP2009/004931.
International Search Report dated Nov. 12, 2009 for international application No. PCT/EP2009/004929.
International Search Report sated Oct. 15, 2009 for international application No. PCT/US09/004930.
Translation of Notice of Preliminary Rejection from Korean Intellectual Property Office dated Jun. 23, 2014.
Office Action for Chinese application 200980127818.7 issued Jan. 6, 2014.

* cited by examiner

*Primary Examiner* — Richard A Huhn
(74) *Attorney, Agent, or Firm* — Gardner Groff Greenwald & Villanueva, PC

(57) ABSTRACT

The invention relates to a method for producing a polymer using a chain transfer agents. In particular, the invention relates to a process for polymerizing a polymer in the presence of a mixture of at least two chain transfer agents, which mixture comprises
a polar chain transfer agent (polar CTA), and
a non-polar (non-polar CTA).

10 Claims, No Drawings

PROCESS FOR PRODUCING A POLYMER AND A POLYMER FOR WIRE AND CABLE APPLICATIONS

IN THE CROSS-REFERENCE TO RELATED APPLICATIONS

This application claims priority to European Application Nos. 08252349.9 and 08252360.6, filed Jul. 10, 2008, which is hereby incorporated herein by reference in its entirety for all purposes.

FIELD OF INVENTION

The invention relates to a process for producing a polymer, preferably in a high pressure process. The invention further relates to a use of chain transfer agents for producing the polymer and to a use of chain transfer agents to modify the polymer properties during the polymerization thereof. The invention also relates to a polymer, which is preferably produced according to the process of the invention, for preparing an article, preferably a cable for wire or cable (W&C) applications.

BACKGROUND ART

Chain Transfer Agents (CTA) are used during high pressure polymerisation of ethylene to low density polyethylene (LDPE) to control the molecular weight and thus indirectly melt flow rate (MFR) of the formed polymer. The mechanism is based on hydrogen atoms that are easy to abstract. Typical CTA are methylethylketone, propionaldehyde, propylene etc.

A CTAs is a group of agents including polar or non-polar CTAs according to their chemical nature. Propylene (C3) is an example of a non-polar CTA. This is assumed to provide good electrical properties due to its non-polar structure, especially when it comes to dielectric losses. Another benefit when using propylene as CTA is that vinyl groups are introduced into the polyethylene chain giving improved peroxide crosslinking properties.

Another type is the polar CTA, such as propionaldehyde (PA). Due to its polar structure it is assumed not to be beneficial to use this CTA in applications where low losses are a requirement.

Significance of
Significance of Tan δ (Dielectric Losses):

The tan δ and thus the dielectric losses (which are linearly proportional to the tan δ) shall be as low as possible for both technical and economical reasons:

- Low losses means that low amount of transmitted electric energy is lost as thermal energy inside the cable insulation. These losses will mean economic losses for the power line operator.
- Low losses will reduce the risk for thermal runaway, i.e. an unstable situation where the temperature of the insulation will increase due to the tan δ. When the temperature is increased, normally the tan δ will also increase. This will further increase the dielectric losses, and thus the temperature. The results will be a dielectric failure of the cable that needs to be replaced.

Significance of dc Conductivity:

The electric conductivity will control the leakage current through the insulation. This current will lead to tan δ, that is electric energy transformed into heat inside the insulation leading to negative economical consequences for the power line operator. The electric conductivity shall therefore be as low was possible.

Significance of Space Charge:

Space charges inside the insulation will distort the electric field and may lead to points of very high electric stress, that if it is high enough a dielectric failure will follow.

Preferably there should be no space charges present as it will make it possible to easily design the cable as the electric field distribution in the insulation will be known.

Normally space charges are located close to the electrodes; charges of the same polarity as the nearby electrode are called homocharges, charges of opposite polarity are called heterocharges. The heterocharges will increase the electric field at this electrode, homocharges will instead reduce the electric field. Thus, if voltage polarities will not take place in the power system, as in case of voltage source converters systems, homocharges will be less dangerous than heterocharges.

There is a continuous need in the polymer field to find polymers which are suitable for demanding polymer applications such as wire and cable applications with high requirements and stringent regulations.

OBJECTS OF THE INVENTION

One of the objects of the present invention is to provide an alternative process for producing polymers with advantageous properties suitable for instance for W&C applications.

A further object of the invention is to provide a combination of chain transfer agents which can be used for modifying polymer properties during the polymerization process thereof.

Another object of the invention is to provide a polymer which has very advantageous electrical properties suitable for demanding end applications, such as W&C.

Moreover, the invention provides a use of a polymer, preferably of a polymer obtainable by the process of the invention, for producing a cable comprising a conductor surrounded by one or more layers. Also a cable is provided which comprises the polymer of the invention in one or more layers thereof and which is suitable for power cable applications.

The invention and further objects thereof are described and defined in details below.

DESCRIPTION OF THE INVENTION

Contrary to earlier understanding, polymers polymerized in the presence of a polar chain transfer agent (referred herein polar CTA) have surprisingly good electrical properties, such as unexpectedly low dielectric losses at 50 Hz as shown by tan δ measurements (especially at high temperatures and stresses).

Unexpectedly, the polymer produced using a polar CTA have acceptable tan δ at low stress (5 kV/mm) and low temperatures (25° C.) and low losses when measured at high stress (25 kV/mm) and high temperatures (130° C.) when measured on crosslinked 10 kV cables samples according to method described in "Test for tan δ" under Determination methods. At room temperature, the polymers have tan δ acceptable for medium voltage cable applications. Moreover, polymers produced using a polar CTA had markedly decreased tan δ at higher temperatures, e.g. as high temperatures as at 100° C. and even at 130° C. Furthermore, the tan δ remains surprisingly low at increased electric stresses.

Accordingly, the first object of the invention is the use of a polar chain transfer agent (referred herein as polar CTA) for producing polymers for polymer applications that require good electrical properties in a wide stress range.

More surprisingly, when said polar CTA is combined with a non-polar chain transfer agent (referred herein as non-polar CTA) and such mixture is used for polymerizing a polymer, then a polymer is obtained which provides very low tan δ not only at high temperatures but in the whole temperature range from 25 to 130° C., and in the whole electric stress range from 5 to 25 kV/mm. Moreover, the mixture of said CTAs provides polymers with markedly decreased tan δ at high temperatures and at high stresses compared to tan δ which result from polymers produced using the polar CTA or non-polar CTA alone (100% feed).

As a second object of the invention provides a process (referred herein as Process) for polymerizing a polymer in the presence of a mixture of at least two chain transfer agents, which mixture comprises
   a polar CTA, and
   a non-polar CTA.

As a still further object of the invention is to provide a polymer having at least one of the following tan δ values ($10^{-4}$), when determined according to "tan δ measurements" as described under determination methods:
i) a dielectric loss at 25° C.
   of less than 7, preferably less than 6, more preferably less than 5, when measured in stress range of 5-25 kV/mm,
ii) a dielectric loss at 130° C.
   of less than 10, preferably less than 8, when measured in the stress range 5
   25 kV/mm, more preferably less than 6.5 when measured in the stress range 20 kV/mm. The measurement was done on 10 kV cables.

Preferably the polymer has the both electrical properties.

Preferably, the polymer of the invention as defined above is obtainable by the process of the invention. The expressions "obtainable by the process" or "produced by the process" are used herein interchangeably and mean the category "product by process", i.e. that the product has a technical feature which is due to the preparation process. The use of CTA-mixture of the invention preferably provides the desirable electric properties as defined above.

As to polymer produced according to a process of the invention preferably has one or more, preferably all the properties given above for the polymer of the invention.

Thus the polymer of the invention as defined above using electrical properties and the polymer produced by the process of the invention as defined above (product by process) are independent inventions, preferably dependent on each other, in any order, and are commonly referred herein as Polymer.

The Polymer is preferably produced in high pressure process by radical polymerization.

The preferred embodiments, subgroups and properties of the invention are described generally below and can be combined in any combinations.

CTAs

The mixture of CTAs of the invention is referred herein as CTA-Mixture. The CTA-mixture can be used in a conventional manner adjusting the molecular weight and thus melt flow rate (MFR) of the produced polymer. The preferable amounts of the CTA-mixture correspond to amounts used for said purpose in prior art using one CTA alone. Accordingly, as evident for a skilled person the preferable amounts of CTA-mixture used in a polymerization process can vary widely depending i.a. on the polymerisation conditions and desired MFR of the produced polymer, and can be adapted by a skilled person accordingly.

The effects of the invention are achieved by the use of a polar CTA or preferably of the CTA-mixture. Therefore also the ratio of non-polar and polar CTA in the CTA-mixture is not critical, but can be varied substantially without loosing the surprisingly good electrical properties.

In a preferred embodiment the feed ratio by weight % of polar CTA to non-polar CTA is
   1 to 99 wt % of polar CTA and
   1 to 99 wt % of non-polar CTA, based on the combined amount of the feed of polar CTA and the non-polar CTA.
Preferably, said feed ratio by weight % is
   5 to 95% of polar CTA and
   95 to 5% of non-polar CTA, based on the combined amount of the feed of the polar CTA and the non-polar CTA.

In one embodiment of the invention, wherein low dielectric losses are required for a polymer particularly at high temperatures and at high stresses, the feed ratio by weight of polar CTA to non-polar CTA is preferably 3 to 97 wt % of polar CTA and 97 to 3 wt % of non-polar CTA based on the combined amount of the feed of the polar CTA and the non-polar CTA.

Polar CTAs and non-polar CTAs suitable for the Process are not limited. Preferably the polar CTA is selected from one or more of
i) a compound comprising one or more polar group(s) selected from nitrile (CN), sulfide, hydroxyl, alkoxy, aldehydyl(HC=O), carbonyl, carboxyl or ester group(s), or mixtures thereof;
ii) an aromatic organic compound, or
iii) any mixture thereof.

Preferably any such polar CTA will have up to 12 carbon atoms, e.g. up to 10 carbon atoms preferably up to 8 carbon atoms. A preferred option includes a straight chain or branched chain alkane having up to 12 carbon atoms (e.g. up to 8 carbon atoms) and having at least one nitrile (CN), sulfide, hydroxyl, alkoxy, aldehydyl(HC=O), carbonyl, carboxyl or ester group.

More preferably the polar CTA is selected from one or more of i) a compound containing one or more hydroxyl, alkoxy, HC=O, carbonyl, carboxyl and ester group(s), or a mixture thereof, more preferably from an aldehyde or ketone compound. Most preferably aldehyde compound. The preferred polar CTA is a straight chain or branched chain aldehyde or ketone having up to 12 carbon atoms, preferably up to 8 carbon atoms, especially up to 6 carbon atoms, most preferably methylethylketone (MEK) or propionaldehyde (PA), most preferably propionaldehyde (PA).

Preferably, the non-polar CTA is selected from one or more of
i) a compound which does not contain a polar group selected from nitrile (CN), sulfide, hydroxyl, alkoxy, aldehydyl (HC=O), carbonyl, carboxyl or ester group(s), or mixtures thereof; preferably from a non-aromatic, straight chain branched or cyclic hydrocarbyl optionally containing a hetero atom such as O, N, S, Si or P. More preferably the non-polar CTA is selected from one or more of an cyclic alpha-olefin of 5 to 12 carbon or of a straight or branched chain alpha-olefin of 3 to 12 carbon atoms, more preferably of a straight or branched chain alpha-olefin of 3 to 6 carbon atoms. The preferred non-polar CTA is propylene.

If propylene is used as a CTA agent, then it means herein that it is not taken to contribute to the comonomer content of the polymer.

Polymer

The polymer is preferably a polyolefin, preferably polyethylene more preferably low density polyethylene (LDPE) polymer produced in a high pressure (HP) process by radical polymerization. LDPE polymer is selected from LDPE homopolymer or LDPE copolymer with one or more comonomers. LDPE polymers are well known and documented in the literature.

In case of copolymer of ethylene, preferably LDPE copolymer, the one or more comonomer(s) may be selected e.g. from one or more olefins, such as alpha-olefins with 3 to 20 carbon atoms, polar comonomer(s) or polyunsaturated comonomer(s), as well known. Such polar comonomer is preferably selected from comonomers containing hydroxyl groups, alkoxy groups, carbonyl groups, ether groups, carboxyl groups, and ester groups. More preferably polar comonomer(s) of ethylene copolymer contains carboxyl and/or ester groups, still more preferably acrylate or acetate groups. It is preferred that the polar ethylene copolymer comprises polar comonomer(s) that are selected from $C_1$- to $C_6$-alkyl acrylates, $C_1$- to $C_6$-alkyl methacrylates, and vinyl acetate, such as methyl, ethyl, propyl or butyl acrylates or vinyl acetate or mixtures thereof. The unsaturated comonomers are described below under Process.

The polymer, preferably LDPE polymer may optionally have an unsaturation provided by polymerizing monomer, preferably ethylene, in the presence of a chain transfer agent which introduces vinyl groups to the polymer chain, or in the presence of one or more polyunsaturated comonomer(s) and optionally in the presence of a chain transfer agent which introduces vinyl groups to the polymer chain. The unsaturated polymers, preferably unsaturated LDPE polymers are well known. The unsaturation level can also to a certain extent be influenced by the selected polymerization conditions such as peak temperatures and pressure.

The preferred polyolefin of the invention is a LDPE homopolymer which may optionally have an unsaturation or optionally unsaturated LDPE copolymer. If the LDPE homopolymer is unsaturated, then the unsaturation is provided by a chain transfer agent (CTA) and/or by polymerization conditions. If the LDPE copolymer is unsaturated, then the unsaturation can be provided by any of the following means: by a chain transfer agent (CTA), by one or more polyunsaturated comonomer(s) and/or by polymerization conditions.

Process

The preferred Process is a high pressure (HP) process for producing a polyolefin, preferably a low density polyethylene (LDPE) polymer selected from LDPE homopolymer or LDPE copolymer with one or more comonomers. LDPE polymer are well known and documented in the literature.

As mentioned above, the inventive feature for preparing the Polymer of invention lies in the use of a combination of at least two CTA's, non-polar and polar CTA, during the polymerisation of the Polymer. Therefore the ratio of CTA's and the used amounts thereof in relation to monomer feed, preferably ethylene feed, of the polymer and optional comonomer feed, e.g. polar comonomer feed, can freely be adjusted to tailor the electrical properties desired for the Polymer depending on the end application of the Polymer.

Accordingly, the Polymer of the invention can be prepared using i.a. any conventional polymerisation process and equipment and any conventional process conditions and control means can be used for adjusting the polymer properties, such as MFR, density, optional unsaturation etc in order to achieve the desired Polymer properties depending on the desired embodiment. The polymer is preferably produced at high pressure by free radical initiated polymerisation (referred to as high pressure radical polymerization). The preferred Polymer is LDPE homopolymer or LDPE copolymer with one or more comonomer(s), as defined above. The high pressure (HP) polymerisation and the adjustment of process conditions are well known and described in the literature, and can readily be used by a skilled person to provide the Polymer of the invention.

High pressure polymerisation can be effected in a tubular reactor or an autoclave reactor, preferably in a tubular reactor. In one preferable HP process the monomer, preferably ethylene, is polymerized, optionally together with one or more comonomer(s), in the presence of the mixture of chain transfer agents of the invention, preferably in a tubular reactor to obtain a LDPE homopolymer or copolymer with good electrical properties as defined above. The process is descried below and can be adapted to other polymers as well:

Compression:

Ethylene is fed to a compressor mainly to enable handling of high amounts of ethylene at controlled temperature. The compressors are usually a piston compressor or diaphragm compressors. The compressor is usually a series of compressors that can work in series or in parallel. Most common is 2-5 compression steps. Recycled ethylene and comonomers can be added at feasible points depending on the pressure. Temperature is typically low, usually in the range of less than 200° C. or less than 100° C. Less than 200° C. is preferred.

Tubular Reactor:

The mixture is fed to the tube reactor. First part of the tube is to adjust the temperature of the feed ethylene; usual temperature is 150-170° C. Then the radical initiator is added. As the radical initiator, any compound or a mixture thereof that decomposes to radicals at a elevated temperature can be used. Usable radical initiators are commercially available. The polymerization reaction is exothermic. There can be several radical initiator injections points, e.g. 1-5 points, usually provided with separate injection pumps. The addition of the non-polar and polar CTAs is not limited and can be tailored by a skilled person within the limits of the invention depending on the desired end properties of Polymer. Accordingly, the two chain transfer agents can be added in any injection point to the polymer mixture and in any addition order jointly or separately. The addition of one or two CTAs can be effected from one or more injection point(s) at any time during the polymerization. The addition includes the fresh and recycled CTAs' feed. Also ethylene and optional comonomer(s) can be added at any time of the process, at any zone of the tubular reactor and from one or more injection point(s), e.g. 1-5 point(s), with or without separate compressors. The reactor is continuously cooled e.g. by water or steam. The highest temperature is called peak temperature and the lowest temperature is called radical initiator temperature. The "lowest temperature" means herein the reaction starting temperature which is called the initiation temperature which is "lower" as evident to a skilled person.

Suitable temperatures range from 80 to 350° C. and pressure from 100 to 400 MPa. Pressure can be measured at least in compression stage and after the tube. Temperature can measured at several points during all steps. High temperature and high pressure generally increase output. Using various temperature profiles selected by a person skilled in the art will allow control of structure of polymer chain, i.e. Long Chain Branching and/or Short Chain branching, density, branching factor, distribution of comonomers, MFR, viscosity, Molecular Weight Distribution etc.

The reactor ends conventionally with a valve. The valve regulates reactor pressure and depressurizes the reaction mixture from reaction pressure to separation pressure.

Separation:

The pressure is typically reduced to 10 to 45 MPa, preferably to approx 30 to 45 MPa. The polymer is separated from the unreacted products, for instance gaseous products, such as monomer or the optional comonomer, and most of the unreacted products are recovered. Normally low molecular compounds, i.e. wax, are removed from the gas. The pressure can further be lowered to recover and recycle the unused gaseous products, such as ethylene. The gas is usually cooled and cleaned before recycling.

Then the obtained polymer melt is normally mixed and pelletized. Optionally, or in some embodiments preferably, additive(s) can be added in the mixer. Further details of the production of ethylene (co)polymers by high pressure radical polymerization can be found in the Encyclopedia of Polymer Science and Engineering, Vol. 6 (1986), pp 383-410.

As to polymer properties, e.g. MFR of the polymerised Polymer, preferably LDPE polymer, can be adjusted by using e.g. chain transfer agent during the polymerisation, or by adjusting reaction temperature or pressure (which also to a certain extent have an influence on the unsaturation level).

When an unsaturated LDPE copolymer of the invention is prepared, then, as well known, the C—C double bond content can be adjusted by polymerising the ethylene e.g. in the presence of one or more polyunsaturated comonomer(s), chain transfer agent(s), or both, using the desired feed ratio between C2 and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers, such as an α,ω-alkadienes, to increase the unsaturation of an ethylene copolymer. The non-reacted double bond(s) thus provides i.a. pendant vinyl groups to the formed polymer chain at the site, where the polyunsaturated comonomer was incorporated by polymerization. As a result the unsaturation can be uniformly distributed along the polymer chain in random copolymerisation manner. Also e.g. WO 9635732 describes high pressure radical polymerisation of ethylene and a certain type of polyunsaturated α,ω-divinylsiloxanes. Moreover, as known, e.g. propylene can be used as a chain transfer agent to provide said double bonds, whereby it can also partly be copolymerised with ethylene.

The invention also provides the use of a CTA-mixture as chain transfer agents for producing a polymer.

As mentioned above, Polymer of the invention may be combined with additive(s) and optionally with further polymer components. Polymer of the invention may be combined with further polymer components optionally, and preferably, together with additives, such as antioxidant(s), free radical generating agent(s), such as crosslinking agent(s), e.g. organic peroxides, scorch retarder(s) (SR), crosslinking booster(s), stabiliser(s), processing aid(s), flame retardant additive(s), water tree retardant additive(s), acid scavenger(s), inorganic filler(s) and voltage stabilizer(s), as known in the polymer field.

Accordingly, the Polymer has advantageous electrical properties which are preferable especially for AC cable applications. In a further embodiment the electrical properties of the Polymer are also be preferable for direct current (DC) applications.

The use of polar CTA, preferably the use of a CTA-mixture as defined above for producing a polymer for cable applications.

End Uses and End Applications of the Invention

The new Polymer of the invention is highly feasible in wide variety of end applications of polymers. The preferred use of the Polymer is in W&C applications.

Typically in W&C applications the density of the ethylene homo- or copolymer as said polymer, preferably LDPE polymer, is higher than 0.860 g/cm$^3$. Preferably the density of the ethylene homo- or copolymer is not higher than 0.960 g/cm$^3$. The MFR$_2$ (2.16 kg, 190° C.) of the ethylene homo- or copolymer as said preferred polymer is preferably from 0.01 to 50 g/10 min, more preferably is from 0.1 to 20 g/10 min, and most preferably is from 0.2 to 10 g/10 min.

A further object of the invention is to provide a cable, preferably a power cable, comprising a conductor surrounded by one or more layers, wherein at least one of said layer(s) comprises a Polymer of the invention as defined above by means of electrical properties thereof or a Polymer obtainable by the process as defined above.

One preferred Polymer of the invention is crosslinkable Polymer. It is preferably used for crosslinkable cable applications. Crosslinking can be effected i.a. by radical reaction using radiation or free radical generating agents, also called crosslinking agents. Examples of such free radical generating agents are peroxides including inorganic and organic peroxides. A further well known crosslinking method is crosslinking via functional groups, e.g. by hydrolysing hydrolysable silane groups, which are linked (either via copolymerisation or via grafting) to polymer, and subsequently condensing the formed silanol groups using a silanol condensation catalyst. In this preferable embodiment, after crosslinking the crosslinked Polymer has the preferable electrical properties as defined above, below or in claims.

The invention thus provides a cable comprising a conductor surrounded by one or more layers, wherein at least one layer comprises said Polymer as defined above.

The term "conductor" means herein above and below that the conductor comprises one or more wires. Moreover, the cable may comprise one or more such conductors. Preferably the conductor is an electrical conductor.

In one preferable embodiment of the cable of the invention at least one layer is an insulation layer which comprises said polymer composition of the invention. It is generally known that insulation layers have high requirements for electrical properties.

As a further embodiment of the cable of the invention, a power cable is provided which comprises at least an inner semiconductive layer, insulation layer and an outer semiconductive layer, in that order, optionally surrounded by a jacketing layer, wherein at least one of said layers, preferably at least the insulation layer, comprises said Polymer.

A power cable is defined to be a cable transferring energy operating at any voltage, typically operating at voltages higher than 1 kV. The voltage applied to the power cable can be alternating (AC), direct (DC), or transient (impulse). The polymer of the invention is very suitable for power cables, especially for power cables operating at voltages higher than 6 kV and are known i.a. as medium voltage (MV), high voltage (HV) and extra high voltage (EHV) power cables, which terms have well known meaning and indicate the operating level of such cable.

The invention is also highly suitable for AC cable layer materials and can also have advantageous electrical properties required for the DC cable layer materials due to advantageous space charge and dc conductivity properties.

In a preferable embodiment, the cable is a Power cable, optionally a AC Power cable, which comprises at least an inner semiconductive layer, insulation layer and an outer semiconductive layer, in that order, optionally surrounded by a jacketing layer, wherein at least one of said layers, preferably at least the insulation layer, comprises said Polymer as defined above or in claims.

In one preferable embodiment of the Power cable of the invention the at least one layer is an insulation layer which consists of said Polymer of the invention as the sole polymer component. However it is to be understood herein that the Polymer in said layer may be combined with additives which optionally have been added to the polymer as a mixture with a carrier polymer, i.e. in a form of so-called master batch.

More preferably the Power cable is crosslinkable and after crosslinking the crosslinked Power cable has the preferable electrical properties as defined above.

The Invention also provides a process for preparing a cable, preferably crosslinkable power cable, comprising steps of applying, preferably by (co)extrusion, one or more layers on a conductor, which layers comprise a polymer, wherein at least one layer comprises said polymer composition of the invention.

The term "(co)extrusion" means herein that in case of two or more layers, said layers can be extruded in separate steps, or at least two or all of said layers can be coextruded in a same extrusion step, as well known in the art.

Determination Methods

Unless otherwise stated in the description or experimental part the following methods were used for the property determinations.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$). The MFR is determined at 230° C. for polypropylenes.

Density

The density was measured according to ISO 1183D. The sample preparation was executed according to ISO 1872-2.

Test for Tan δ Measurements on 10 kV Cables

Cable Production

Polymers pellets containing antioxidant and dicumylperoxide were used to produce 10 kV cables on a Maillefer pilot cable line of CCV type. The cables have 3.4 mm nominal insulation thickness (the inner semiconductive layer is 0.9 mm thick and the outer semiconductive layer is 1 mm thick). The conductor cross section was 50 mm² stranded aluminium. The cable was produced as a 1+2 construction (e.g. first the inner semiconductive layer was applied onto the conductor and then the remaining two layer were applied via the same extrusion head to the conductor having already the inner semiconductive layer applied). The semiconductive material used as inner and out semiconductive material was LE0592 (a commercially semiconductive material supplied by Borealis). The cable cores were produced with a line speed of 1.6 m/min.

Cable Length:

Preparation of Cable Sample:

12.5 m of each cable were available for the tests; active test length in the loss factor tests was approximately 11 m. The length is chosen to be in accordance with IEC 60502-2; i.e. ≥10 m active test length between the guard rings of the test object.

Conditioning:

The cables are thermally treated in a ventilated oven at 70° C. for 72 hours before the measurements. The samples are afterwards kept in sealed aluminium bags until the tan δ measurements are done.

Test Method:

Both ends of the loss factor cables were equipped with electric field grading cloths. Each termination was 0.7 m long. The ends were put into plastic bags that were filled with $SF_6$-gas and sealed by tapes. The $SF_6$-gas was used to increase the corona inception voltage beyond the maximum test voltage of ~55 kV.

20 cm from the stress cones guard rings were introduced. A 2 mm gap was opened in the insulation screen. A 5 cm long thick walled heat shrink tube (Raychem) was used over the guard rings to avoid any influence of partial discharges and/or leakage currents from the highly stressed terminations during the measurements.

The active test length was wrapped in a 0.45 m wide and 0.2 mm thick Al-foil (6-7 layers). Afterwards this was covered with a continuous insulating heat shrinkable tube.

All tan δ-measurements were performed with the cable coiled inside a large ventilated oven. The terminations were mounted and connected to the high voltage transformer outside the ventilated oven. The guard rings were also located outside of the oven.

In order to reach isothermal conditions within the entire cable a period of 2 hours was required between the measurements on each temperature level. The cable is thus heated by this oven, and not by conductor heating.

The 50 Hz test voltages corresponding to 5, 10, 15, 20 and 25 kV/mm conductor stress were determined after the dimensions of the cables were measured.

The tan δ bridge was of the type Schering Bridge Tettex 2801 H1-64. The system was checked prior to the measurements by the use of tan δ standards.

EXPERIMENTAL PART

Preparation of Polymers of the Examples 1-4 and 6 of the Present Invention and the Comparative Example 5

All polymers were low density polyethylenes produced in a high pressure reactor. The inventive polymers were produced according to the following descriptions:

Inventive Example 1 (PA) LDPE

Ethylene was compressed in a 5-stage precompressor and a 2-stage hyper compressor with intermediate cooling to reach an initial reaction pressure of 2200 bar. The total compressor throughput was 30 tons/hour. In the compressor area approximately 10.9 kg/hour of propionaldehyde (PA) was added as chain transfer agent to maintain an MFR of 2.2 g/10 min. The compressed mixture was heated to approximately 165° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerization reaction to reach peak temperatures of ca 295° C. after which it was cooled to approx 225° C. The subsequent $2^{nd}$ and $3^{rd}$ peak reaction temperatures were ca 285° C. and ca 268° C., respectively, with a cooling in between down to approximately 247° C. The reaction mixture was depressurized by a kick valve, cooled and polymer was separated from unreacted gas.

Inventive Example 2 (C3 and PA) LDPE

Ethylene was compressed in a 5-stage precompressor and a 2-stage hyper compressor with intermediate cooling to reach an initial reaction pressure of 2300 bar. The total compressor throughput was 30 tons/hour. In the compressor area approximately 6.4 kg/hour of propionaldehyde was added together with approximately 52 kg/hour of propylene as chain transfer agent to maintain an MFR of 2.0 g/10 min. The compressed mixture was heated to approximately 165° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerization reaction to reach peak temperatures of ca 291° C. after which it was cooled to approx 227° C. The subsequent $2^{nd}$ and $3^{rd}$ peak reaction temperatures were ca 283° C. and ca 266° C., respectively, with a cooling in between down to approximately 235° C. The reaction mixture was depressurized by a kick valve, cooled and polymer was separated from unreacted gas.

Inventive Example 3 (C3 and PA) LDPE

Ethylene was compressed in a 5-stage precompressor and a 2-stage hyper compressor with intermediate cooling to reach an initial reaction pressure of 2500 bar. The total compressor throughput was 30 tons/hour. In the compressor area approximately 5.6 kg/hour of propionaldehyde was added together with approximately 78 kg/hour of propylene as chain transfer agent to maintain an MFR of 2.0 g/10 min. The compressed mixture was heated to approximately 165° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerization reaction to reach peak temperatures of ca 288° C. after which it was cooled to approx 225° C. The subsequent $2^{nd}$ and $3^{rd}$ peak reaction temperatures were ca 285° C. and ca 268° C., respectively, with a cooling in between down to approximately 228° C. The reaction mixture was depressurized by a kick valve, cooled and polymer was separated from unreacted gas.

Inventive Example 4 (C3 and PA) LDPE

Ethylene was compressed in a 5-stage precompressor and a 2-stage hyper compressor with intermediate cooling to reach an initial reaction pressure of 2500 bar. The total compressor throughput was 30 tons/hour. In the compressor area approximately 4 kg/hour of propionaldehyde was added together with approximately 107 kg/hour of propylene as chain transfer agent to maintain an MFR of 1.8 g/10 min. The compressed mixture was heated to approximately 165° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerization reaction to reach peak temperatures of ca 287° C. after which it was cooled to approx 225° C. The subsequent $2^{nd}$ and $3^{rd}$ peak reaction temperatures were ca 286° C. and ca 269° C., respectively, with a cooling in between down to approximately 230° C. The reaction mixture was depressurized by a kick valve, cooled and polymer was separated from unreacted gas.

Comparative Example 5 (C3) LDPE

Ethylene was compressed in a 5-stage precompressor and a 2-stage hyper compressor with intermediate cooling to reach an initial reaction pressure of 3000 bar. The total compressor throughput was 30 tons/hour. In the compressor area approximately 177 kg/hour of propylene as chain transfer agent was added to maintain an MFR of 1.8 g/10 min. The compressed mixture was heated to approximately 165° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerization reaction to reach peak temperatures of ca 280° C. after which it was cooled to approx 225° C. The subsequent $2^{nd}$ and $3^{rd}$ peak reaction temperatures were ca 272° C. and ca 258° C., respectively, with a cooling in between down to approximately 245° C. The reaction mixture was depressurized by a kick valve, cooled and polymer was separated from unreacted gas.

Inventive Example 6: (PA and C3)

Ethylene was compressed in a 5-stage precompressor and a 2-stage hyper compressor with intermediate cooling to reach an initial reaction pressure of 2600 bar. The total compressor throughput was 30 tons/hour. In the compressor area approximately 4 kg/hour of propionaldehyde was added together with approximately 77 kg/hour of propylene as chain transfer agent to maintain an MFR of 1.9 g/10 min. The compressed mixture was heated to approximately 165° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerization reaction to reach peak temperatures of 281° C. after which it was cooled to approx 208° C. The subsequent $2^{nd}$ and $3^{rd}$ peak reaction temperatures were ca 282° C. and ca 262° C., respectively, with a cooling in between down to approximately 217° C. The reaction mixture was depressurized by a kick valve, cooled and polymer was separated from unreacted gas.

To these polymers an antioxidant was added in an amount of 0.2 wt % (CAS number 96-69-5) and a peroxide as a crosslinking agent in an amount of 2 wt % (CAS number 80-43-3).

Characterisation Data

| Inventive polymer | $MFR_2$ (g/10 min) | Density (kg/m$^3$) |
| --- | --- | --- |
| Inventive polymer 1 | 2.2 | 921.8 |
| Inventive polymer 2 | 2.0 | 921.4 |
| Inventive polymer 3 | 2.0 | 921.9 |
| Inventive polymer 4 | 1.8 | 921.5 |
| Inventive polymer 5 | 1.8 | 921.9 |
| Inventive polymer 6 | 1.9 | 920.4 |

Test for Dielectric losses: Sample preparation and test method was carried out as described above under "Test for tan δ measurements on 10 kV cables"

TABLE 1

Data and results on the electrical testing, Example 5 in the table denotes the Comparative example 5.
Tan δ values ($10^{-4}$) measured on 10 kV cables.

|  | Example 1 | Example 2 | Example 3 | Example 4 | Comparative example 5 |
|---|---|---|---|---|---|
| 25° C. | | | | | |
| 5 kV/mm | 6.3 | 3.7 | 4.2 | 2.6 | 0.8 |
| 10 kV/mm | 6.4 | 3.9 | 4.3 | 2.7 | 0.9 |
| 15 kV/mm | 6.4 | 3.9 | 4.3 | 2.7 | 0.9 |
| 20 kV/mm | 6.4 | 3.9 | 4.3 | 2.7 | 0.9 |
| 25 kV/mm | 6.4 | 3.9 | 4.3 | 2.7 | 0.9 |
| 100° C. | | | | | |
| 5 kV/mm | 0.1 | 0.1 | 0.1 | 0.1 | 0.1 |
| 10 kV/mm | 0.1 | 0.2 | 0.1 | 0.1 | 0.1 |
| 15 kV/mm | 0.3 | 0.3 | 0.2 | 0.4 | 0.3 |
| 20 kV/mm | 0.5 | 0.4 | 0.4 | 0.7 | 0.6 |
| 25 kV/mm | 0.8 | 0.6 | 0.6 | 1.2 | 1.1 |
| 130° C. | | | | | |
| 5 kV/mm | 0.9 | 0.6 | 0.7 | 0.8 | 0.7 |
| 10 kV/mm | 1.7 | 1.3 | 1.3 | 2.2 | 2.1 |
| 15 kV/mm | 2.8 | 1.8 | 2.1 | 3.7 | 3.8 |
| 20 kV/mm | 4.4 | 2.9 | 3.2 | 6.1 | 6.7 |
| 25 kV/mm | 6.8 | 4.3 | 4.6 | 9 | 10.3 |

The presented data indeed show that it is possible to combine the polar CTA and the non-polar CTA in such a way to obtain a low loss at low temperature (25° C.) and low stress (5 kV/mm) as well at high temperature (130° C.) and high stress (25 kV/mm).

The invention claimed is:

1. A process for the preparation of a cable comprising a conductor surrounded by one or more layers, the process comprising:

polymerizing ethylene and optionally at least one further olefin in a high pressure process by radical polymerization to form an LDPE homopolymer or LDPE copolymer, wherein said polymerization occurs in the presence of a mixture of at least two chain transfer agents, the mixture comprising: a polar chain transfer agent (polar CTA) and a non-polar chain transfer agent (non-polar CTA), wherein the non-polar CTA is selected from the group consisting of cyclic alpha-olefins of 5 to 12 carbon atoms and straight or branched chain alpha-olefins of 3 to 12 carbon atoms;

and applying said LDPE homopolymer or LDPE copolymer onto said conductor to form said one or more layers.

2. The process of claim 1, wherein the feed ratio by weight % of polar CTA to non-polar CTA is of 1 to 99 wt. % of polar CTA and 1 to 99 wt. % of non-polar CTA, based on the combined amount of the feed of the polar CTA and the non-polar CTA.

3. The process according to claim 1, wherein the polar CTA is selected from one or more of a compound comprising one or more polar group(s) selected from nitrile, sulfide, hydroxyl, alkoxy, aldehydyl, carbonyl, carboxyl, and ester group(s), or a mixture thereof.

4. The process according to claim 1, wherein the polar CTA is selected from one or more of a compound containing one or more hydroxyl, alkoxy, aldehydyl, carbonyl, carboxyl, and ester group(s), or a mixture thereof.

5. The process according to claim 1, wherein the polar CTA is an aldehyde or ketone compound.

6. The process according to claim 1, wherein the polar CTA is methyl ethyl ketone or propionaldehyde.

7. The process according to claim 1, wherein the polar CTA is an aldehyde compound.

8. The process according to claim 1, wherein the polar CTA is propionaldehyde.

9. The process according to claim 1, wherein the non-polar CTA is selected from one or more of straight or branched chain alpha-olefin of 3 to 6 carbon atoms.

10. The process according to claim 1, wherein the non-polar CTA is propylene.

* * * * *